(12) United States Patent
Wang et al.

(10) Patent No.: US 7,516,686 B2
(45) Date of Patent: Apr. 14, 2009

(54) TWO-FLUTE TWIST DRILL

(75) Inventors: Yuhong Wang, Shanghai (CN);
Ying-Hao Zhang, Shanghai (CN)

(73) Assignee: TG Tools United Company, St. Charles, IL (US)

( * ) Notice: Subject to any disclaimer, the term of this patent is extended or adjusted under 35 U.S.C. 154(b) by 0 days.

(21) Appl. No.: 11/929,108

(22) Filed: Oct. 30, 2007

(65) Prior Publication Data

US 2008/0060478 A1    Mar. 13, 2008

Related U.S. Application Data

(62) Division of application No. 10/658,513, filed on Sep. 9, 2003, now abandoned.

(51) Int. Cl.
*B21K 5/04*    (2006.01)
*B23B 51/02*    (2006.01)

(52) U.S. Cl. .................. 76/108.6; 408/230

(58) Field of Classification Search ............... 76/108.1, 76/108.6, 115; 408/230
See application file for complete search history.

(56) References Cited

U.S. PATENT DOCUMENTS

| | | | |
|---|---|---|---|
| 465,392 A | 12/1891 | Shippee | |
| 1,069,930 A | 8/1913 | Down | |
| 1,151,247 A * | 8/1915 | Denk | 72/95 |
| 1,216,628 A | 2/1917 | Teasck | |
| 1,384,733 A | 7/1921 | Woods | |
| 2,230,645 A | 2/1941 | Jones | |
| 2,457,132 A * | 12/1948 | Delaney | 72/64 |
| 2,778,252 A | 1/1957 | Oxford, Jr. | |
| 3,452,625 A | 7/1969 | Russo | |
| 3,564,947 A | 2/1971 | Maier | |
| 3,584,420 A * | 6/1971 | Southland | 451/216 |
| 3,592,555 A | 7/1971 | Mackey, Sr. | |
| 3,779,664 A | 12/1973 | Caley et al. | |
| 3,854,840 A | 12/1974 | Miyanaga | |
| 4,031,672 A * | 6/1977 | Moores et al. | 451/48 |
| 4,116,580 A | 9/1978 | Hall et al. | |
| 4,209,275 A | 6/1980 | Kim | |
| 4,231,692 A | 11/1980 | Brabetz et al. | |
| 4,330,229 A | 5/1982 | Croydon | |
| 4,400,119 A | 8/1983 | Clement | |
| 4,411,563 A | 10/1983 | Moon | |
| 4,520,599 A * | 6/1985 | Slinsky | 451/375 |

(Continued)

FOREIGN PATENT DOCUMENTS

JP      03117507 A    5/1991

OTHER PUBLICATIONS

Metal Cutting Tool Handbook, published by Industrial Press, Inc. at least as early as 1989 pp. 2, 62-64, 84-85, 168-169, 494-499, 556-557, showing end mill configurations.

(Continued)

*Primary Examiner*—Hwei-Siu C Payer
(74) *Attorney, Agent, or Firm*—Greenberg Traurig LLP

(57) ABSTRACT

A twist drill for use, predominantly by non-professional do-it-yourself workers incorporates a flute architecture with an internal ridge for promoting the break up of chips into short length components. The tip of the twist drill includes an axial relief construction for improved performance across a wide variety of materials, and a highly sloped face for prompting transport of chips away from the drill tip.

3 Claims, 11 Drawing Sheets

U.S. PATENT DOCUMENTS

| | | | |
|---|---|---|---|
| 4,556,347 A | 12/1985 | Barish | |
| 4,561,813 A | 12/1985 | Schneider | |
| 4,565,473 A | 1/1986 | Hosoi | |
| 4,566,227 A * | 1/1986 | Wolff | 451/375 |
| 4,573,838 A | 3/1986 | Omi et al. | |
| 4,635,340 A * | 1/1987 | Link | 29/558 |
| 4,642,942 A | 2/1987 | Guhring | |
| 4,671,710 A | 6/1987 | Araki | |
| 4,687,388 A | 8/1987 | Yokota et al. | |
| 4,688,972 A | 8/1987 | Kubota | |
| 4,740,121 A | 4/1988 | Arnold | |
| 4,837,983 A * | 6/1989 | Fuller, Jr. | 451/8 |
| 4,878,788 A | 11/1989 | Wakihira et al. | |
| 4,898,503 A * | 2/1990 | Barish | 408/230 |
| 4,968,193 A | 11/1990 | Chaconas et al. | |
| 4,974,372 A * | 12/1990 | Chantalat | 451/48 |
| 4,992,009 A | 2/1991 | Wallach | |
| 5,011,342 A | 4/1991 | Hsu | |
| 5,056,967 A | 10/1991 | Hageman | |
| 5,088,863 A | 2/1992 | Imanaga et al. | |
| 5,145,296 A | 9/1992 | Hougen | |
| 5,236,291 A | 8/1993 | Agapiou et al. | |
| 5,273,380 A | 12/1993 | Musacchia | |
| 5,288,183 A | 2/1994 | Chaconas et al. | |
| 5,380,133 A | 1/1995 | Schimmer | |
| 5,779,399 A | 7/1998 | Kuberski | |
| 5,865,574 A | 2/1999 | Tukala | |
| 5,876,202 A | 3/1999 | Berlin | |
| 5,893,688 A | 4/1999 | Wiker et al. | |
| 5,944,460 A | 8/1999 | Gill | |
| 5,947,659 A | 9/1999 | Mays | |
| 5,980,166 A | 11/1999 | Ogura | |
| 6,012,882 A | 1/2000 | Turchan | |
| 6,036,410 A | 3/2000 | Shun'ko | |
| 6,056,486 A | 5/2000 | Colvin | |
| 6,113,321 A | 9/2000 | Mulroy et al. | |
| 6,126,367 A | 10/2000 | Reed | |
| 6,190,097 B1 | 2/2001 | Thomas | |
| 6,231,281 B1 | 5/2001 | Nishikawa | |
| D445,436 S | 7/2001 | George | |
| 6,435,780 B1 | 8/2002 | Flynn | |
| 6,443,674 B1 | 9/2002 | Jaconi | |
| 6,450,272 B2 | 9/2002 | Hauptmann et al. | |
| 6,511,265 B1 | 1/2003 | Mirchandani et al. | |
| 6,585,460 B1 * | 7/2003 | Meece et al. | 408/230 |
| 6,602,029 B1 | 8/2003 | George | |
| 7,140,815 B2 * | 11/2006 | George et al. | 408/230 |
| 2007/0081870 A1 * | 4/2007 | Muhlfriedel et al. | 408/230 |

OTHER PUBLICATIONS

Jiangsu Tiangong Tools Corporation Limited catalog, China, at least as early as Sep. 8, 2002.
Shenli Tools Co., Ltd. catalog, China, at least as early as Sep. 8, 2002.
A photo of a drill, illustrating a common single-flute construction (apart from the wire hole), on sale at least as early as Sep. 8, 2002.
A photo of a glass drill bit, illustrating a construction on sale at least as early as Sep. 8, 2002.

* cited by examiner

4–Flute

3–Flute

TWO-FLUTE TWIST DRILL

This application is a division of Ser. No. 10/658,513, filed Sep. 9, 2003, and now abandoned, and claims priority of the filing date thereof.

BACKGROUND OF THE INVENTION

1. The Technical Field

The present invention is directed to twist drills for use, primarily by non-professionals, for multiple material applications (wood, drywall, plastic, rubber, non-ferrous metals and thin ferrous plate or sheets).

2. The Prior Art

For each type of material (wood, drywall, plastic, rubber, non-ferrous metals, ferrous metals, ceramics, glass), there exists a specific twist drill design which can be optimized for use with that particular material. However, such highly specialized twist drills can be expensive in and of themselves, and having a complete suite of twist drills for each material can present an expense that only a professional machine shop can afford. For individual persons or small businesses, such highly specialized twist drills can be an unjustifiable expense.

In addition, twist drills that are made for "home" or non-professional use, that is, for drilling in typical materials as wood, drywall, plastic, rubber, non-ferrous metals (e.g., aluminum, copper), and thin ferrous plate (sheet steel), are typically configured to produce relatively long spiral or coiled chips, which can be bothersome as they tend to collect around the drilling site, and can interfere with the actual operation of the twist drill.

Therefore, it would be desirable to provide an improved twist drill design that is capable of performing well when used with a wide variety of materials.

It would be desirable to provide a twist drill design, particularly for multiple materials, that is capable of providing smooth, clean drilling.

It would also be desirable to provide a twist drill design that has improved material removal characteristics.

It would also be desirable to provide a twist drill design particularly suited for non-professional or home use, which is configured to produce small chips that are readily removed from the interface between the work material and the twist drill, for improved performance.

These and other desirable characteristics of the present invention will become apparent in view of the present specification, including claims, and drawings.

SUMMARY OF THE INVENTION

The present invention comprises in part a twist drill for forming holes in or through a workpiece, having a longitudinal axis around which the twist drill is rotated and in the direction of which the twist drill is advanced into the workpiece, and two transverse axes disposed perpendicular to each other and to the longitudinal axis.

The twist drill comprises a shank, for enabling the twist drill to be mounted to a driving device. A body emanates from, and is coaxial with the shank. The body has a radius. At least one flute extends helically along the body. At least one land is disposed adjacent to the at least one flute. A point structure is formed on an end of the body distal to the shank. The point structure is generally in the form of a brad point having an extreme tip through which the longitudinal axis of the drill passes. The point structure further has two spur structures on opposite sides thereof. A cutting lip is disposed on a leading edge of each of the spur structures. The drill further includes planar axial relief surfaces on trailing surfaces of the lands which intersect the cutting lips.

The point preferably comprises a first radially outwardly disposed portion of the at least one land angling inwardly and axially toward the shank, to a position between a peripheral portion of the body, and the longitudinal axis and a second, radially inwardly disposed portion of the at least one land, angling inwardly and axially away from the shank and toward the central point structure.

The first radially outwardly disposed portion of the at least one land is preferably defined at least in part by a leading edge angle $\beta_1$ and a trailing edge angle $\beta_2$, wherein $\beta_1=15°\pm10°$ and $\beta_2=12°\pm7°$.

The second, radially inwardly disposed portion of the at least one land is preferably defined at least in part by a point angle $\alpha_1$, and an angle $\alpha_2$ which represents an axial separation between the central point structure and radially outer portions of the at least one land, wherein $\alpha_1=80°\text{-}100°$, inclusive; and $\alpha_2=140°\text{-}170°$, inclusive.

The twist drill further comprises the at least one flute terminating in a cutting lip disposed proximate the point. The at least one flute has a sectional configuration, in a plane perpendicular to the longitudinal axis, incorporating a leading edge and a trailing edge. A straight surface extends inwardly from the leading edge, at least to a position coplanar with a plane passing perpendicularly through the straight surface to the longitudinal axis. A first concave curved portion extends from an inward end of the straight surface and may have at least one radius of curvature less than one-half the radius of the twist drill body. A second concave curved portion extends inwardly from the trailing toward an outer edge region of the first concave curved portion. A ridge is formed by the intersection of the outer edge region of the first concave curved portion and an inner edge region of the second concave curved portion.

The ridge may be in the form of a pointed spike. Alternatively, the ridge may be in the form of a rounded bump.

The present invention is also directed to a twist drill for forming holes in or through a workpiece, having a longitudinal axis around which the twist drill is rotated and in the direction of which the twist drill is advanced into the workpiece, and two transverse axes disposed perpendicular to each other and to the longitudinal axis. The twist drill comprises a shank, for enabling the twist drill to be mounted to a driving device. A body emanates from, and is coaxial with the shank, the body having a radius. At least one flute extends helically along the body. At least one land is disposed adjacent to the at least one flute. A point structure is formed on an end of the body distal to the shank. The point structure is generally in the form of a brad point having an extreme tip through which the longitudinal axis of the drill passes. The point structure further has two spur structures on opposite sides thereof. A cutting lip is disposed on a leading edge of each of the spur structures.

The drill further includes planar axial relief surfaces on trailing surfaces of the lands which intersect the cutting lips.

The at least one flute includes a leading edge. A flat surface extends parallel to one of the transverse axes inwardly a distance at least equal to a radius of the drill from the leading edge to a position proximate the second of the transverse axes. At least a first convex curved portion emanates from an inner end of the flat surface, for prompting rapid breakup of chips formed by the point and guided into the at least one flute by rotation of the drill. The at least first convex curved portion terminates in a ridge disposed between the longitudinal axis of the drill and a trailing edge of the at least one flute.

The twist drill further comprises a second convex curved portion, disposed in the at least one flute, between the ridge and the trailing edge of the at least one flute. The ridge may be in the form of a sharp spike extending along the at least one flute. Alternatively, the ridge may be in the form of a rounded bump extending along the at least one flute.

The invention also comprises, in part, a method for making a twist drill comprising the steps of:

forming a cylindrical blank, having a longitudinal axis and two transverse axes extending perpendicular to one another and to the longitudinal axis;

forming at least one flute in the cylindrical blank, the at least one flute including a ridge disposed therein for prompting breakage of chips formed during use of the drill, the at least one flute extending from a point region of the cylindrical blank to a shank region of the cylindrical blank;

forming at least one land in the cylindrical blank, the at least one land extending along the blank adjacent to the at least one land;

grinding the point region of the cylindrical blank to a contact angle;

grinding a brad and spur configuration onto the point region;

forming an axial relief surface on the at least one land, by aligning the blank along a first axis of an three coordinate axis system, inclining the blank a selected angle away from the first axis while maintaining the blank within a plane defined by the first axis and another axis of the three coordinate system, and then inclining the blank a selected angle away from the plane defined by the first axis and another axis of the three coordinate system; and presenting the blank to a planar grinding surface disposed perpendicular to the first axis of a three coordinate system.

The step of grinding the point region of the cylindrical blank to a contact angle, preferably comprises grinding the contact angle $\alpha_2$ to be 140°-170°, inclusive.

The step of grinding a brad and spur configuration onto the point region preferably comprises grinding the point region such that $\alpha_1$=80°-100°, inclusive; $\beta_1$=15°±10° and $\beta_2$=12°±7°.

The step of forming an axial relief surface on the at least one land preferably comprises the steps of:

aligning the blank along the z axis of an x-y-z coordinate system;

inclining the blank, in the y-z plane, a distance of 60°±20° away from the z axis;

inclining the blank, away from the y-z plane, a distance of 20°±10°; and presenting the so inclined blank to a planar grinding surface disposed perpendicular to the z axis.

DETAILED DESCRIPTION OF THE INVENTION

Figure 1:
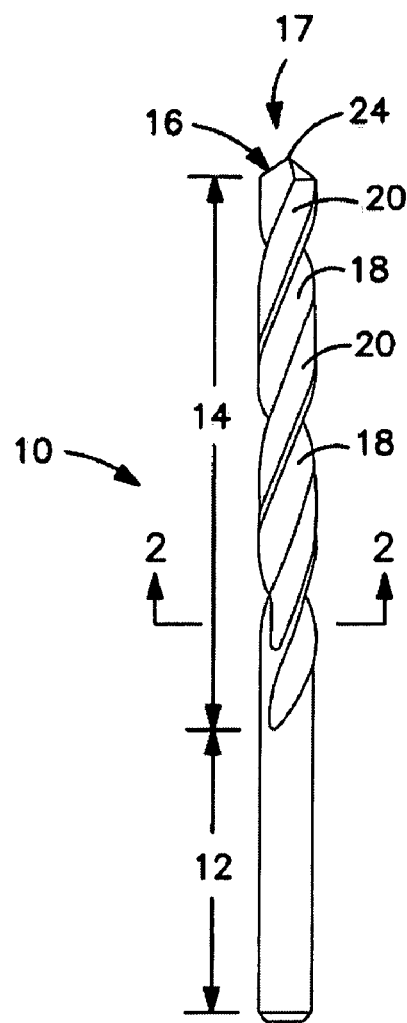
FIG. 1 is a side elevation of a prior art general purpose twist drill.

While this invention is susceptible of embodiment in many different forms, there is shown in the drawings and will be described in detail several specific embodiments, with the understanding that the present disclosure is to be considered an exemplification of the principles of the invention and is not intended to limit the invention to the embodiments illustrated.

Figure 2:
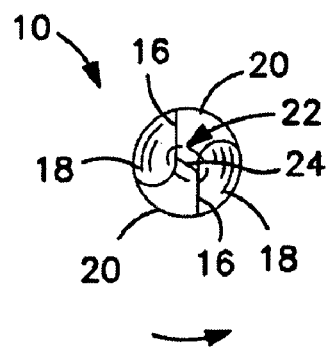
FIG. 2 is a tip end view of the prior art general purpose twist drill of FIG. 1.

FIGS. 1-2 illustrate a prior art general purpose twist drill 10, which may be formed from any suitable material, such as M50 steel, although other materials may be used. Twist drill 10 is shown, not only to provide an illustration of a representative general purpose bit, but also to provide visual reference for certain terms to be used herein, with reference to the twist drill construction of the present invention. Twist drill 10 may be used typically on materials such as brass, bronze, as well as hard plastics, drywall, fiberboard and the like, and such bits are often used by non-professional do-it-yourselfers.

Twist drill 10 (like any twist drill) includes a shank 12 (the end which is gripped by a drill chuck or other mounting structure, a body 14 (the portion of the drill extending from the shank 12 or a neck—not shown—to the outer corners of the cutting lips 16), and a point 17, all of which are centered about the longitudinal axis of the drill, about which the drill rotates, and in the direction of which, the drill is advanced toward and into the workpiece. Only a portion of shank 12 is shown in FIG. 1, and none in FIG. 2. Shank 12 is shown as being cylindrical (the typical home user configuration), but may be tapered (when viewed from the side) and/or polygonal (when viewed in section or from the end), as desired. Twist drill 10 has two flutes 18, separated by two lands 20. Web 22 (generally indicated by the broken line) is the central portion of the body that joins the lands. The extreme end of the web forms the chisel edge 24 of a two-flute drill.

While a drill bit such as bit 10 of FIGS. 1-2 is useful for a relatively wide variety of materials, such drills are less effective for softer materials, such as wood, very soft non-ferrous materials (e.g., lead), rubber and leather, because the shape of the point may tend to merely rub against, heat up and burn the surface of the soft material, rather than digging in, and actually cutting and removing material.

Figure 3:
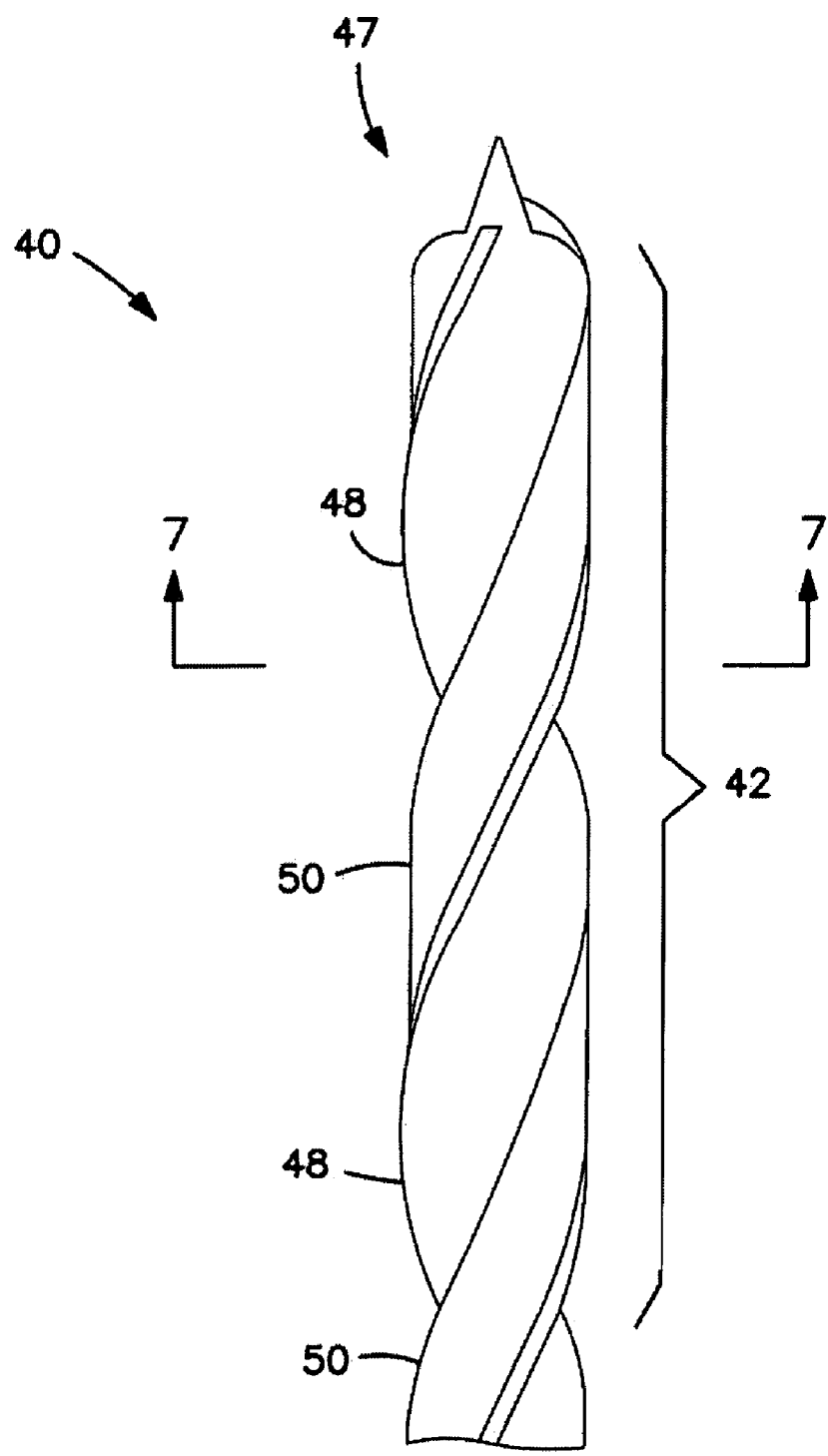
FIG. 3 is a side elevation of a prior art twist drill configured principally for wood drilling.
Figure 4:
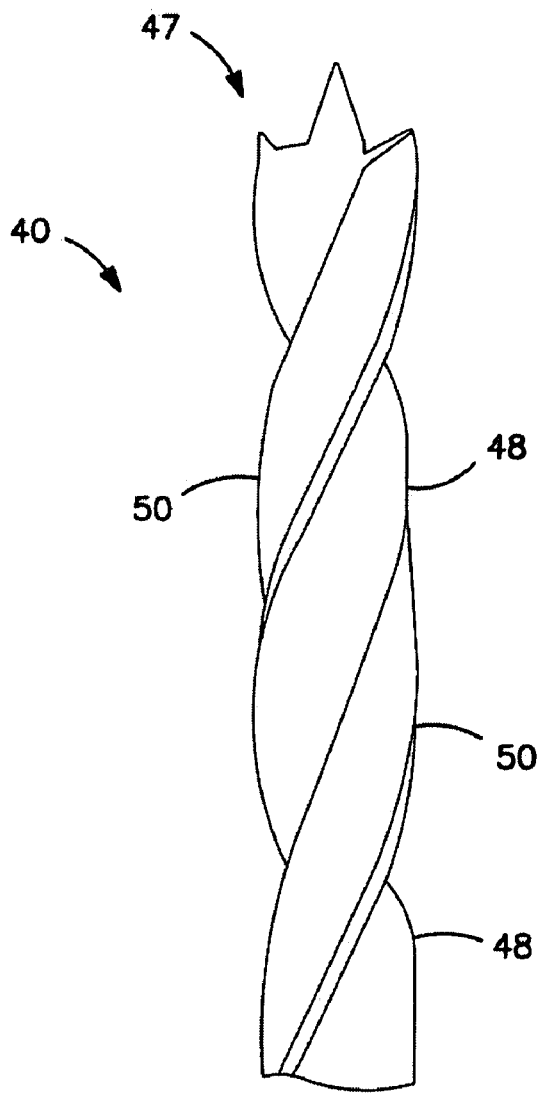
FIG. 4 is a side elevation of the prior art wood twist drill of FIG. 3, rotated approximately 90°.
Figure 5:
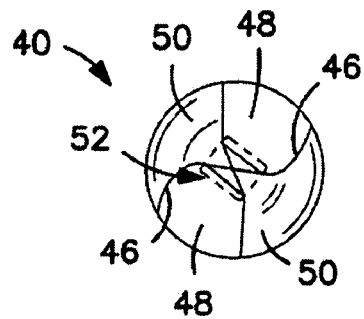
FIG. 5 is a tip end view of the prior art wood twist drill of FIGS. 3 and 4.

Accordingly, twist drills for soft materials are fabricated having a brad and spur configuration such as that shown in FIGS. 3-5. The brad is the center part, and the spurs are the forward angling radially outward portions of the lands (often referred to as a "fish-tail"), particularly the leading edge (relative to the direction of rotation) portions of the lands/ flutes. Twist drill 40 includes a body 42 and a point 47. The shank is not shown, but is understood to be present. Point 47 includes two cutting lips 46. Twist drill 40 has two flutes 48, separated by two lands 50. Web 52 (generally indicated by the broken line) is the central portion of the body that joins the lands. The extreme end of the web 50 forms the sharp-pointed pyramidal tip of the brad and spur two-flute drill 40.

Figure 6:
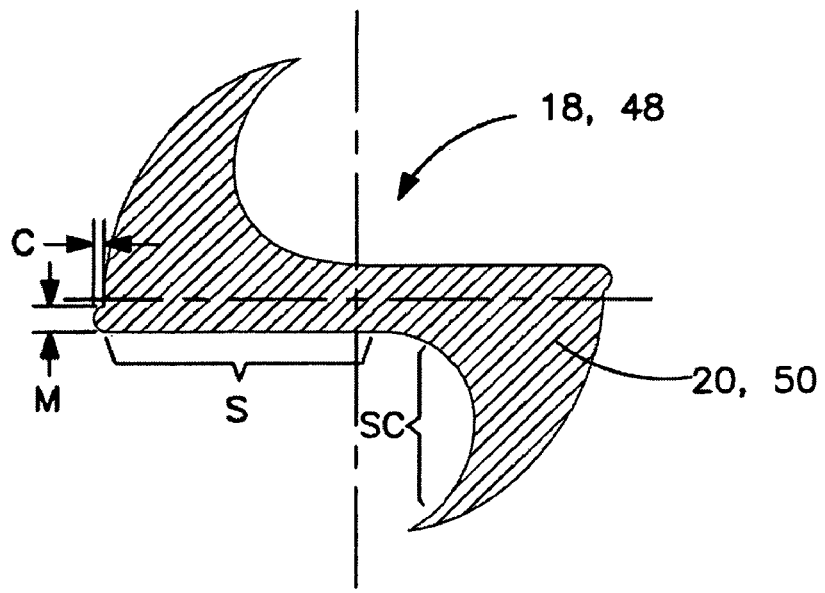
FIG. 6 is a sectional view which may be applicable to the twist drill of FIGS. 1-2, as well as of FIGS. 3-5.

FIG. 6 is a sectional view, which may be applicable to either twist drill 10 or twist drill 40. Distance C represents the clearance, that is the material removed from lands 18, 48, to reduce the amount of undesired rubbing of the lands against the inside surface of the hole being formed by the drill. The margin M is the cylindrical portion of the land which is not cut away to provide clearance. Note that in a conventional section of a twist drill body, there is an elongated straight portion S which ends in a smoothly and continuously curved, often semicircular or elliptical portion SC. During use of the drill, this typically results in the formation of an elongated coiled chip. If the radius of curvature of portion SC decreases toward the radially outer portion of the section, then there will be a tendency for the chip to be more tightly coiled.

Figure 17:
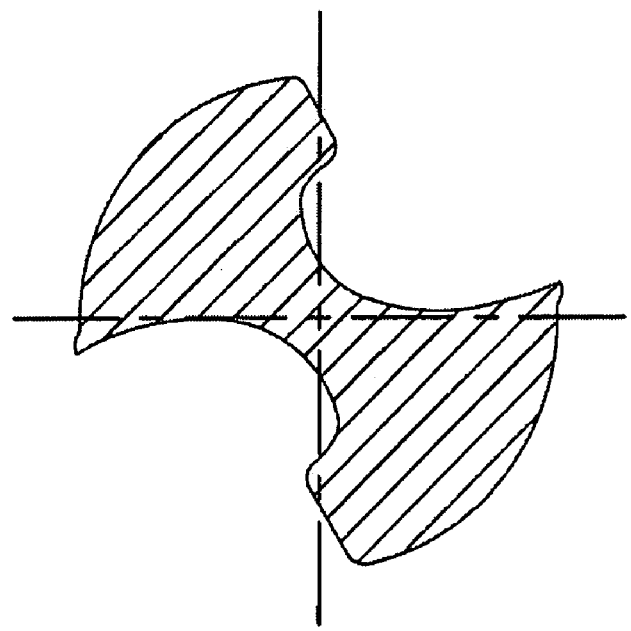
FIG. 17 is a sectional view of a prior art drill.
Figure 16:
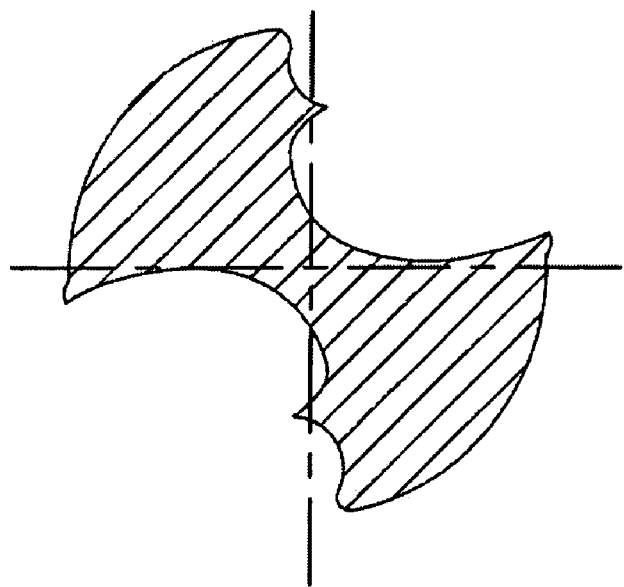
FIG. 16 is a sectional view of a prior art drill.

FIG. 16 is a sectional view of a prior art drill. FIG. 17 is a sectional view of another prior art drill. In the drill of FIG. 16, while the flutes are somewhat divided by a ridge, in view of the presence of the long, continuously curving surface leading from the opposite outer (leading) edge of the flute to the ridge, this design is provided for making tightly curved chips, and not for producing small, quickly broken chips. The short curved surface on the other side of the ridge is not believed to make significant contact with the chip, due to the lack of breakage of the chips. In view of the similarity of the drill of FIG. 16 to that of FIG. 17, it is possible that the short curved section of the flute is for removing material from the drill, for weight saving purposes.

Figure 19:
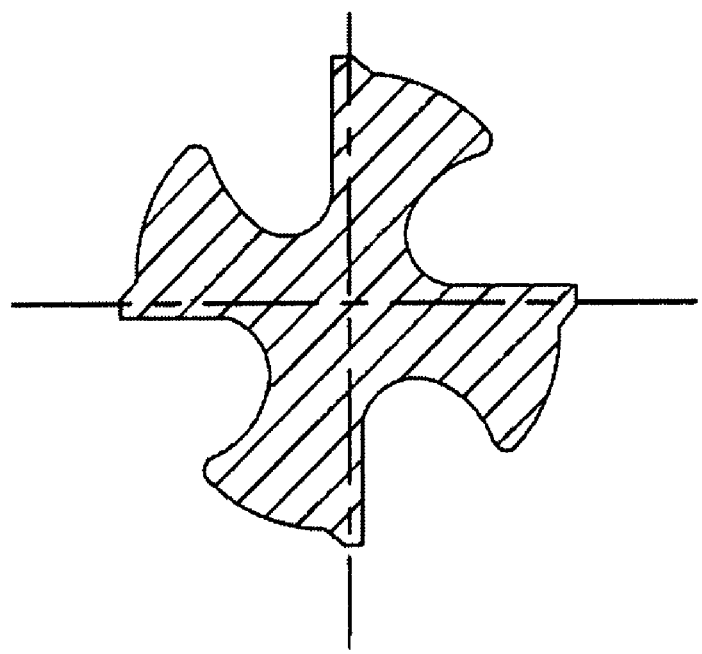
FIG. 19 is a sectional view of a prior art four-flute drill.
Figure 18:
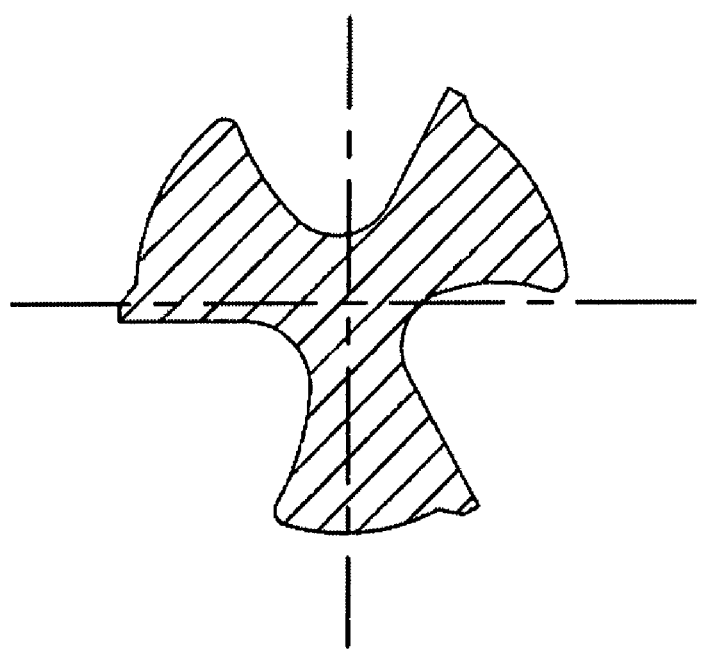
FIG. 18 is a sectional view of a prior art three-flute drill.

FIG. 18 is a sectional view of a prior art three-flute drill. FIG. 19 is a sectional view of a prior art four-flute drill. These multi-flute drills are not for originating holes, as is well known in the art. Instead, drills having three or more flutes are for enlarging holes that have already been initiated by a one- or two-flute drill, or have been previously cored or punched.

Figure 7:
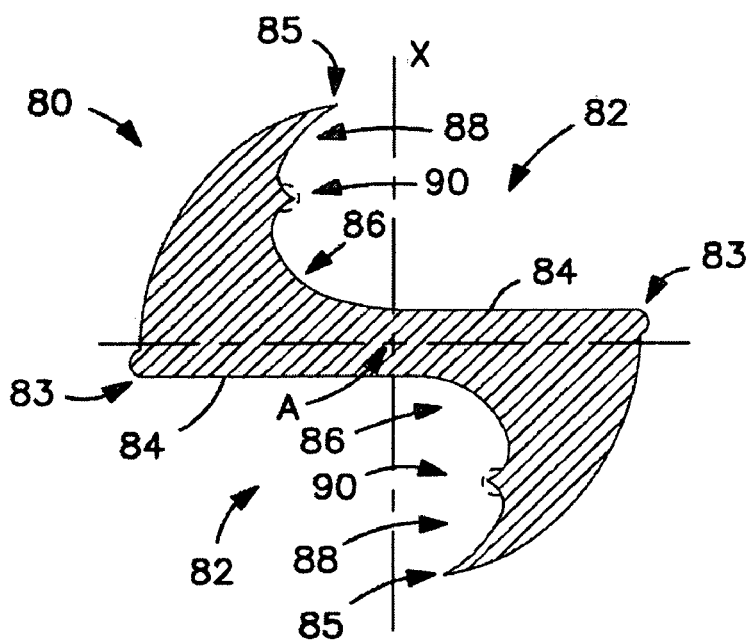
FIG. 7 is a sectional view of a body portion of a twist drill according to an embodiment of the present invention.

FIG. 7 is a representative section of a twist drill according to the present invention, which is independent of the architecture of the point. In section 80, flutes 82 are provided with leading edges 83, straight portions 84, trailing edges 85, and two curved portions 86, 88, which are separated by ridge 90. Straight portions 84 extend from the leading edges of the flutes inwardly, up to and/or past a position coplanar with the axis A of drill section 80. That is, straight section 84 extends up to or past axis X of FIG. 7. Curved portions 86, 88 may be circular, elliptical, or of variable curvature. In FIG. 7, curved portions 86 in particular are of radially outwardly decreasing curvature (which promotes breakage of the chips into small, short pieces), while curved portions 88 are of radially outwardly increasing curvature (which may promote movement of the chip pieces radially outwardly, and along the length of the body portion of the drill, and out of the hole being drilled). The radius curvature of curved portion 86 may be, in at least one location (or in the case of a semi-circle), half or less of the radius of section 80. While ridge 90 ideally is in the form of a sharp spike, as shown in solid lines in FIG. 7, such a configuration requires more intensive manufacturing steps, and increases the cost of each individual drill. Thus, manufacturability and cost considerations mean that in practical commercial versions, ridge 90 will likely be in the form of a broader, blunter spike, or of a rounded or flattened bump, as shown in broken lines in FIG. 7, or of some combination of rounded and/or curved shapes, such as combined convex, concave and/or straight surfaces. The specific form of the ridge 90 itself is not believed to significantly affect the desired result of causing the breakage of the forming chips into short pieces, rather than permitting the chip to form as an elongated spiral. Instead, it is the believed to be the presence of the long straight portion 84, which extends a distance up to and preferably slightly beyond the radius of the drill 80, combined with and followed by the sharp turn created by curved portion 86, which promotes the chip breakage into small pieces.

By providing a twist drill with a flute construction in which the leading section of the flute is straight, and leads to a ridge with a tight radius of curvature, so that chips are broken in to small short lengths, the common problem of melting and clumping (at the drill hole opening) of chips caused by the heat generated by the drilling (typical of plastic, rubber, non-ferrous metals) can be reduced or avoided, because the smaller chip pieces can be expelled more readily through the operation of the drill than elongated chip pieces.

While the flute structure is shown in the environment of a twist drill having a helical flute, the flute structure can also be employed in drills having flutes with less of a spiral nature, such as a spade drill.

Figure 9:
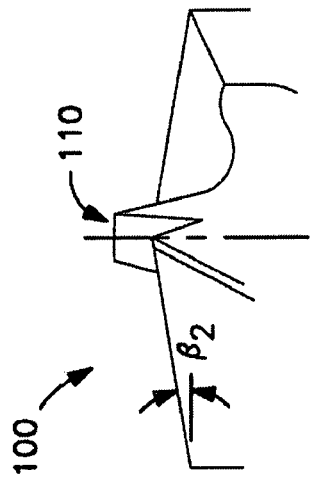
FIG. 9 is a fragmentary side elevation of the point of the partially completed twist drill according to the embodiment of FIG. 8, rotated relative to the view of FIG. 8.
Figure 8:
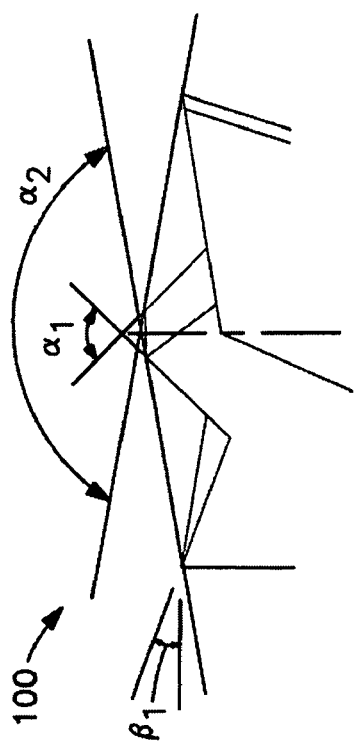
FIG. 8 is a fragmentary side elevation of the point of a twist drill according to an embodiment of the invention, shown in a preliminary stage of formation.
Figure 10:
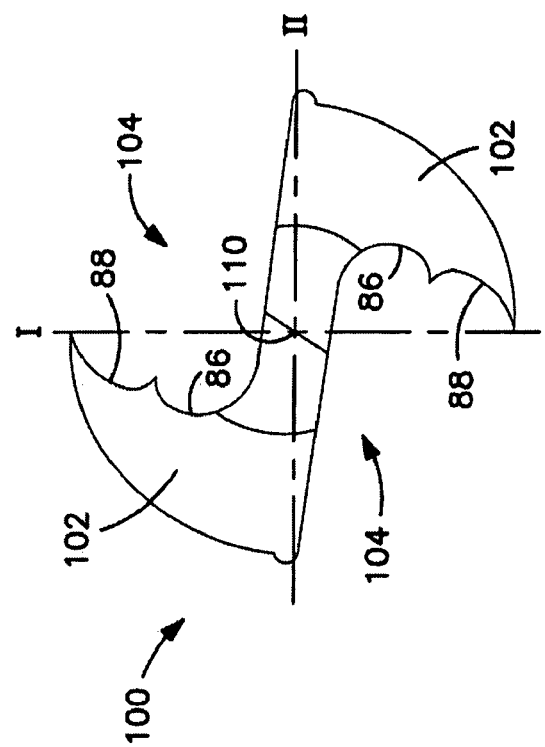
FIG. 10 is a top view of the point of the partially completed twist drill of FIGS. 8 and 9.
Figure 11A:
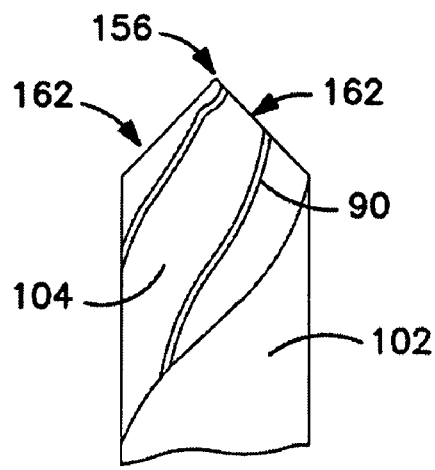
FIG. 11A is a fragmentary side elevation of the completed drill point according to the preferred embodiment FIG. 11, shown rotated approximately 90° from the view of FIG. 11.
Figure 11:
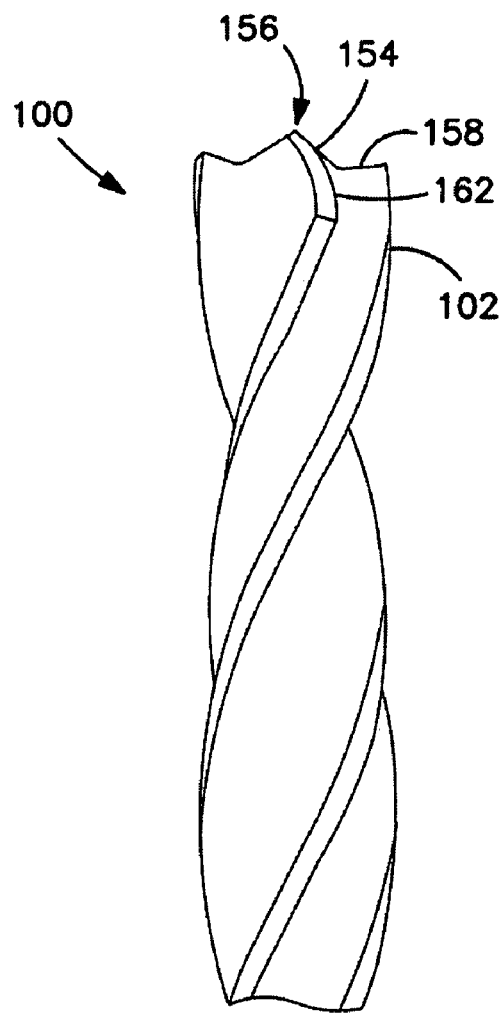
FIG. 11 is a fragmentary side elevation of a completed drill point according to a preferred embodiment of the present invention.
Figure 13:
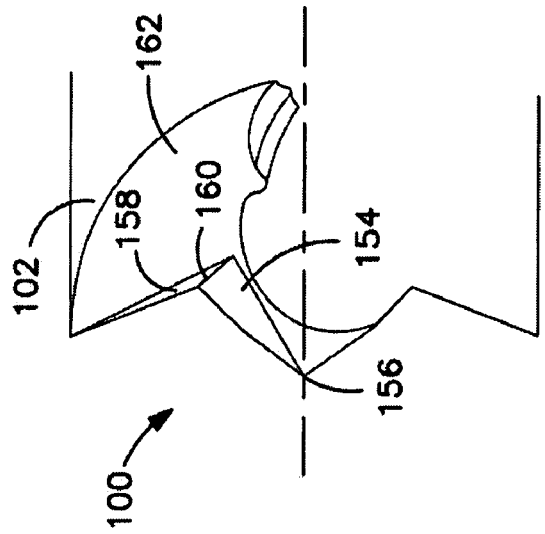
FIG. 13 is a fragmentary side elevation of the drill point of FIG. 12.

FIGS. 8-10 illustrate the first stage for the point construction for a twist drill according to a preferred embodiment of the present invention. Drill 100 includes a body having lands 102, and flutes 104. Flutes 104 will incorporate two curved portions, 86, 88 (shown in FIG. 10, not shown in FIGS. 8 and 9), as described with respect to the body section of FIG. 7. To form the drill, first a raw cylindrical metal blank, often referred to as a "black" is provided with the flutes (including ridges 90), through a roll forging process, the particular details of which would be readily understood by one of ordinary skill in the art, having the present disclosure before them, and so are omitted herein as being not necessary for a complete understanding of the invention. After the flutes are formed, the drill tip is preliminarily formed through a succession of grinding steps. Drill 100 initially is formed with a chisel point 110, which is defined by the following values, making reference to FIGS. 8 and 9:

$\alpha_1$=80°-100°, inclusive (this angle may be called the "sharp" or "brad" angle;

$\alpha_2$=140°-170°, inclusive (this angle may be referred to as the "contact" angle, and which is the angle formed by the first grinding operation;

$\beta_1$=15°±10°; and $\beta_2$=12°±7° (this angle may be referred to as a "relief" angle).

Once these parameters have been selected, in combination with the understanding that in a rotationally symmetrical two-flute drill bit, the leading edges of the cutting lips are 180° opposed from one another, one of ordinary skill in the art having the disclosure before them will be aware of or can readily calculate using known algorithms, all of the contours of the partially fabricated drill of FIGS. 8-10.

The selection of angles $\beta_1$ and $\beta_2$ is dependent, in part, on the diameter of the particular drill. That is, within the given ranges, $\beta_1$ varies in inverse proportion to the diameter of the drill, while $\beta_2$ varies proportionally to the diameter of the drill. After the tip is formed through grinding, according to these initial parameters, the final tip configuration is shown in FIGS. 11-14. After the second stage of grinding is performed, chisel point 110 is re-shaped into its final form, as shown and described herein.

In the final configuration of drill 100, lands 102 are provided with surfaces 154, which slope away from the central point 110, and surfaces 158, which angle upwardly and outwardly from the intersection 160 of surfaces 154 and 158. In addition, as described hereinbelow, drill 100 is also provided with axial relief surfaces 162, on lands 102. The positions of surfaces 154 and 158 result from the configuration of drill 100 as shown in FIGS. 8-10, as subsequently modified by the formation of the axial relief surfaces, as described with respect to FIGS. 12-15.

The radially outer edges of surfaces 158 are, preferably either perpendicular to the longitudinal axis of the drill, or preferably at the very shallow angle $\beta_1$, as defined hereinabove. Drill 100 also includes extreme tip 156, as shown in FIGS. 11A, 11-15.

While intersection 160 is shown in the form of a sharp intersection, this is somewhat idealized, in that in preferred embodiments of the invention, intersection will be a rounded transition, having a relatively small radius of curvature, as an intersection in the form of a sharp line may be less effective in enabling chip removal.

Figure 14:
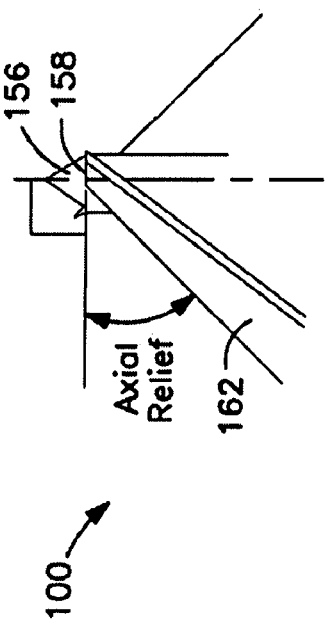
FIG. 14 is a further fragmentary side elevation of the drill point of FIGS. 12 and 13.

In addition, the lands 102 of drill 100 are provided with axial relief, as shown in FIG. 14. As indicated, the angle of the axial relief is between $\beta_2$ (12°±7°, as defined in the previous embodiment) and 60°, maximum. This axial relief is provided at a steeper angle than in prior art drills, particular multi-material drills, in order to provide for rapid chip removal, which is particularly useful when drilling wood. In traditional wood drills, the angle of the cutting lip is the same as the angle of the chip removal surface, that is, the relatively shallow angle $\beta_1$ (relative to a perpendicular to the longitudinal axis of the drill).

Figure 12:
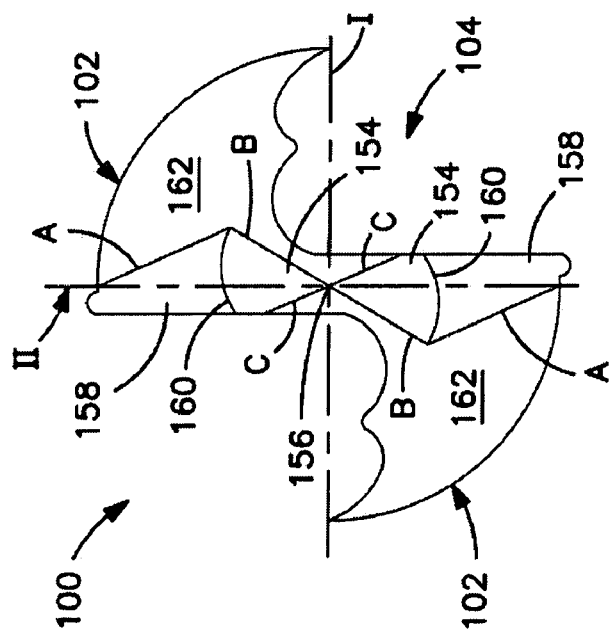
FIG. 12 is a top view of the point of the drill of FIGS. 11 and 11A.
Figure 15:
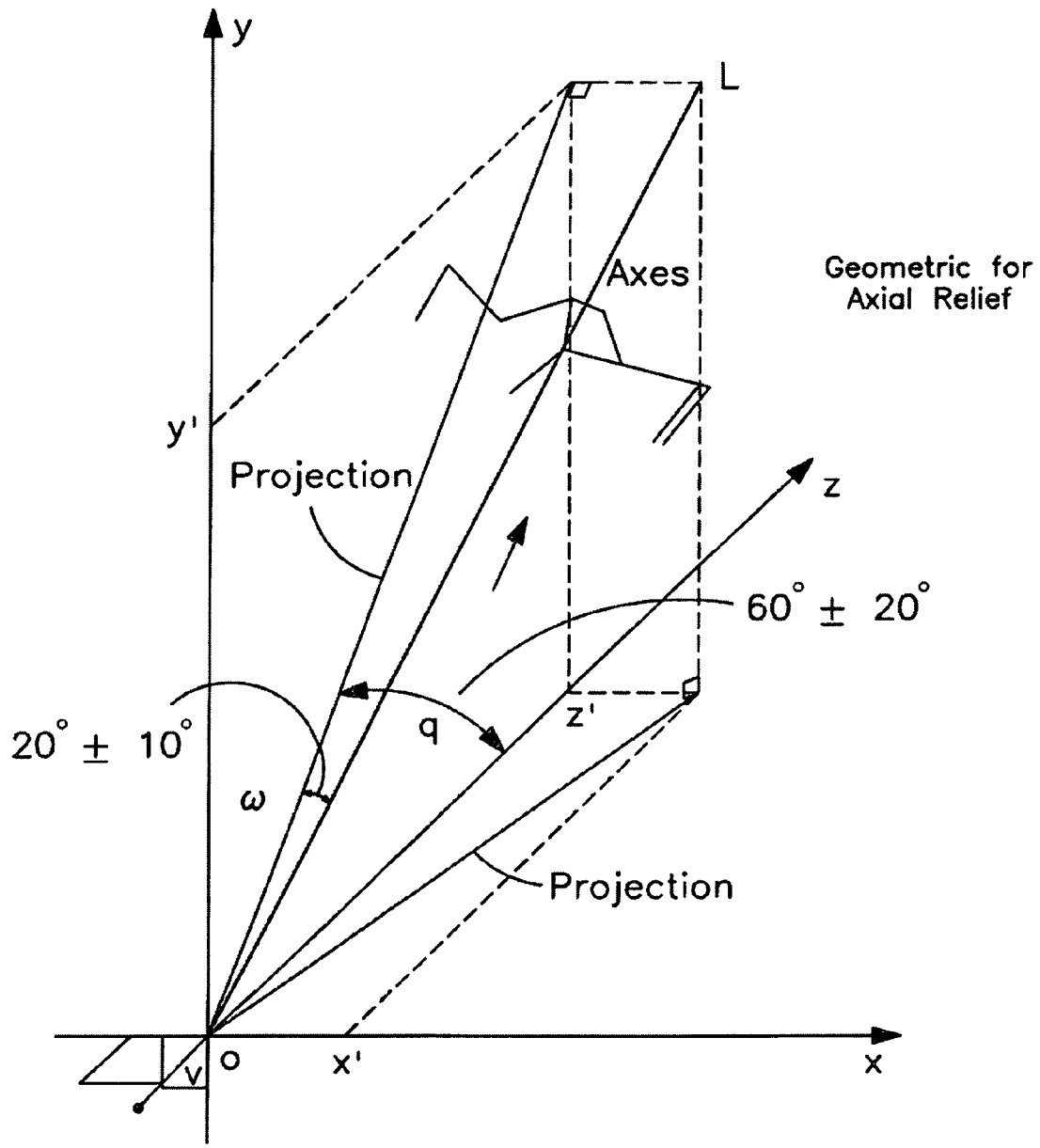
FIG. 15 is a schematic illustration of the geometry for axial relief for the drill point of FIGS. 12-14.

FIG. 15 is an illustration, which would be readily understood, by one of ordinary skill in the art of making drills, and having the present disclosure before them, of the geometry and process for forming the axial relief. The process begins with a partially completed drill 100, as represented by FIGS. 8-10. Making reference to FIG. 15, a drill 100 will be placed in a workpiece holder in a position that is the end result of the following orientation steps. First, visualize, for the purposes of explanation, axes x (horizontal and parallel to the plane of observation of FIG. 15), y (vertical and parallel to the plane of observation of FIG. 15) and z (perpendicular to axes x and y, but shown in perspective). A drill 100 is initially arranged with its shank end at the origin, and the longitudinal axis L extending along and concentric to axis z. Drill 100 would have the rotational orientation shown in FIG. 12, in that axis I (of drill 100 in FIG. 8) would be parallel to axis y, while axis II (of drill 100 in FIG. 8) would be parallel to axis x. The first orientation would be to pivot the drill upwardly from axis z an angle q an amount of 60°±20° in the y-z plane (see the projection line up from axis z). The second orientation would be to pivot the drill an angle w an amount of 20°±10° away from the y-z plane. Once the drill is so oriented (this orientation being performed in a workpiece holder), the drill is then presented (moved along the z axis) to a grinding surface which is parallel to the x-y axis and perpendicular to the z axis. It is this orientation that defines lines A, B and C, of FIG. 12. That is, the further the drill is moved into the grinding surface, the further lines A, B and C are moved "up" the tip of the drill, or in other words, toward axis II, as shown in FIG. 12. It is believed that for drills according to the present invention that are intended for harder materials, it is desired that line A, in particular, is moved farther up the tip of the drill, toward axis II.

A notable difference between the axial relief feature (surface 162) of the present, and such tip structures as a "split point" is that the plane of the axial relief feature of the present invention intersects the cutting lip, along axis II (see FIG. 12), where, in "split point" drills the plane of the cut is well moved off of the cutting lip and intersects and passes through the longitudinal axis of the drill, instead of extending tangentially through it.

The angle q is directly proportional to the diameter of the drill, so that q is progressively greater in larger diameter drills and progressively less in smaller diameter drills. The angle w is inversely proportional to the diameter of the drill. Hardness is also a factor, in that for drills of the same diameter, for a relatively harder material to be drilled, angle q goes down, while angle w goes up.

Once this final axial relief forming step is complete, then the drill is given any final surface finishing steps as may be desired, as are customary in the art of making drill bits.

While axial relief has been employed on end mills, such axial relief which is below 40°, and cannot exceed such a degree of sharpness, as it tends to weaken a tool (end mill) the principal direction of movement of which is perpendicular to the axis of rotation. That is, if the axial relief is too great, it removes from the tip area, the cutting surfaces that are needed for effective end milling material removal, and likewise makes it more likely that the tip will break during such lateral movements.

The steep axial relief employed in the present invention provides less heat created by the drilling process, due to less surface contact. In addition, it is believed that faster drilling can be achieved, in that the axial relief splits the chisel point of the drill to provide easier drilling starts, and because there is less contacting surface, each rotation of the drill can dig deeper into the workpiece. It is also believed that the provision of axial relief in the manner described results in improved self-centering of the drill, which is important to non-professional or non-industrial applications.

The drill of FIGS. 11-14 incorporates a brad and spur point construction which renders the drill usable for both wood, as well as other soft materials, and plastics and metals as well. Its use in non-ferrous materials, such as aluminum or copper, is advantageous because the axial relief provides less surface contact area, which means less heat generated by the drilling, and less sticking of the chips to the bit, through the melting described hereinabove.

Figure 20:
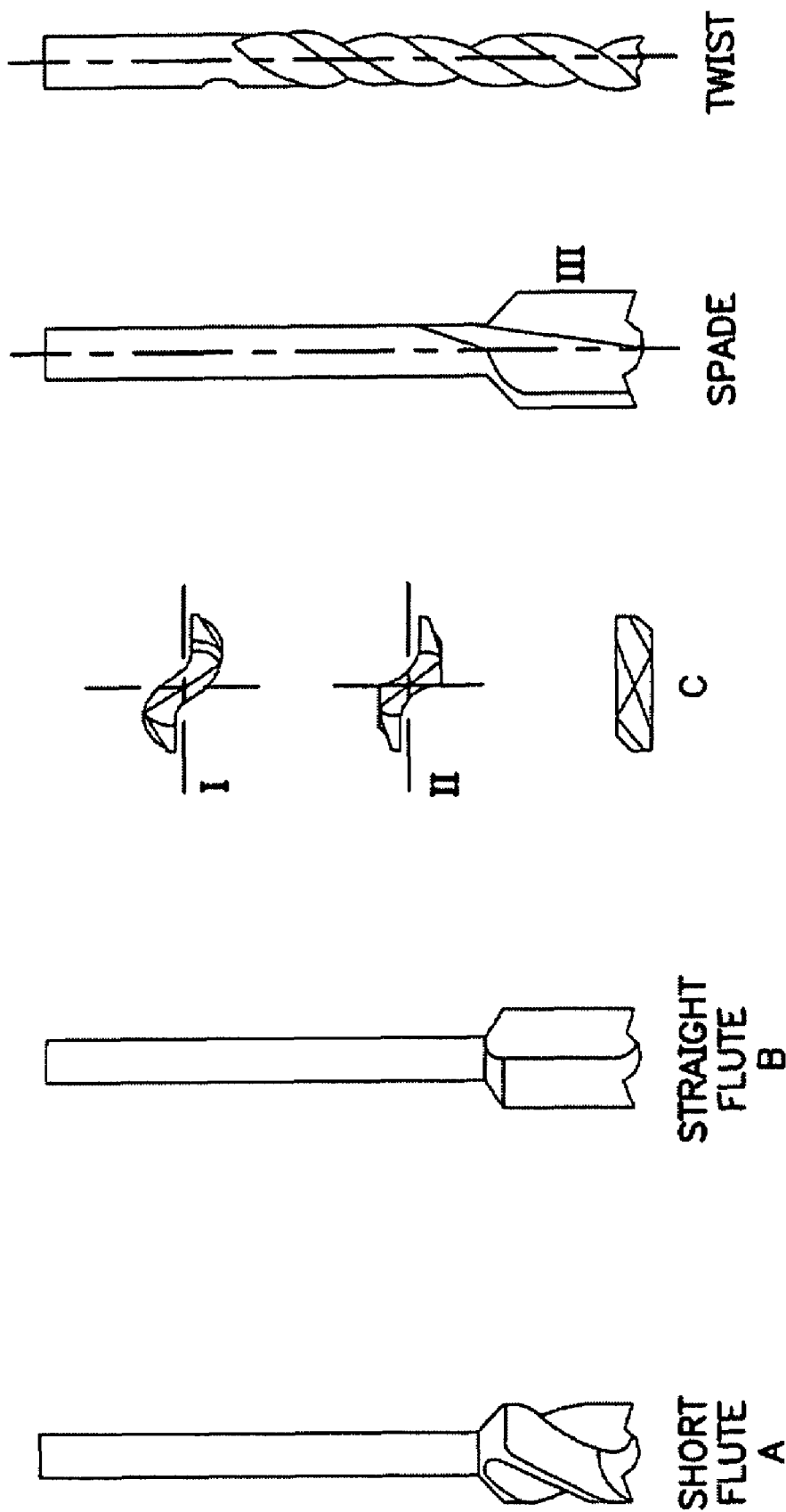
FIG. 20 illustrates side elevations of different styles of drills that may employ point constructions, as that shown in the embodiment of FIGS. 11-15.

FIG. 20 illustrates side elevations of different styles of drills that may employ point constructions, as that shown in the twist embodiment of FIGS. 11-15. FIG. 20-A illustrates for example, a short-flute drill, for which FIG. 20-A-I is a section through the drill body. FIG. 20-B is a straight flute drill, for which FIG. 20-B-II is a section through the body. FIG. 20-C-III is a spade drill, for which FIG. 20-C-III is a section through the body. Each of these is shown, in the sections, as incorporating the axial relief surfaces as shown and described with respect to the twist drill configuration.

In preferred embodiments of the invention, the twist drills are formed from single materials, such as High Speed Steel, M50 steel, M2-M12 steel, carbon steel or any other suitable material.

The foregoing description and drawings merely explain and illustrate the invention, and the invention is not limited thereto, except as those skilled in the art who have the present disclosure before them will be able to make modifications and variations therein without departing from the scope of the invention.

The invention claimed is:

1. A method for making a twist drill comprising:
    forming a cylindrical blank, having a longitudinal axis and two transverse axes extending perpendicular to one another and to the longitudinal axis;
    forming at least one flute in the cylindrical blank, the at least one flute including a ridge disposed therein for prompting breakage of chips formed during use of the drill, the at least one flute extending from a point region of the cylindrical blank to a shank region of the cylindrical blank;
    forming at least one land in the cylindrical blank, the at least one land extending along the blank adjacent to the at least one flute;
    grinding the point region of the cylindrical blank to a contact angle;
    grinding a brad and spur configuration onto the point region;
    forming an axial relief surface on the at least one land, by aligning the blank along a first axis of a three coordinate axis system, inclining the blank a selected angle away from the first axis while maintaining the blank within a plane defined by the first axis and another axis of the three coordinate system, and then inclining the blank a selected angle away from the plane defined by the first axis and another axis of the three coordinate system; and
    presenting the blank to a planar grinding surface disposed perpendicular to the first axis of the three coordinate system.

2. The method according to claim 1, wherein the step of grinding the point region of the cylindrical blank to a contact angle, comprises grinding the contact angle $\alpha_2$ to be 140°-170°, inclusive.

3. The method according to claim 1, wherein the step of forming an axial relief surface on the at least one land comprises the steps of:
    aligning the blank along the z axis of an x-y-z coordinate system;
    inclining the blank, in the y-z plane, a distance of 60°±20° away from the z axis;
    inclining the blank, away from the y-z plane, a distance of 20°±10°; and
    presenting the so inclined blank to a planar grinding surface disposed perpendicular to the z axis.

* * * * *